Oct. 27, 1942. H. T. PLATZ 2,300,172
AUTOMATIC BAR WELDING APPARATUS
Filed Dec. 9, 1935 3 Sheets-Sheet 1
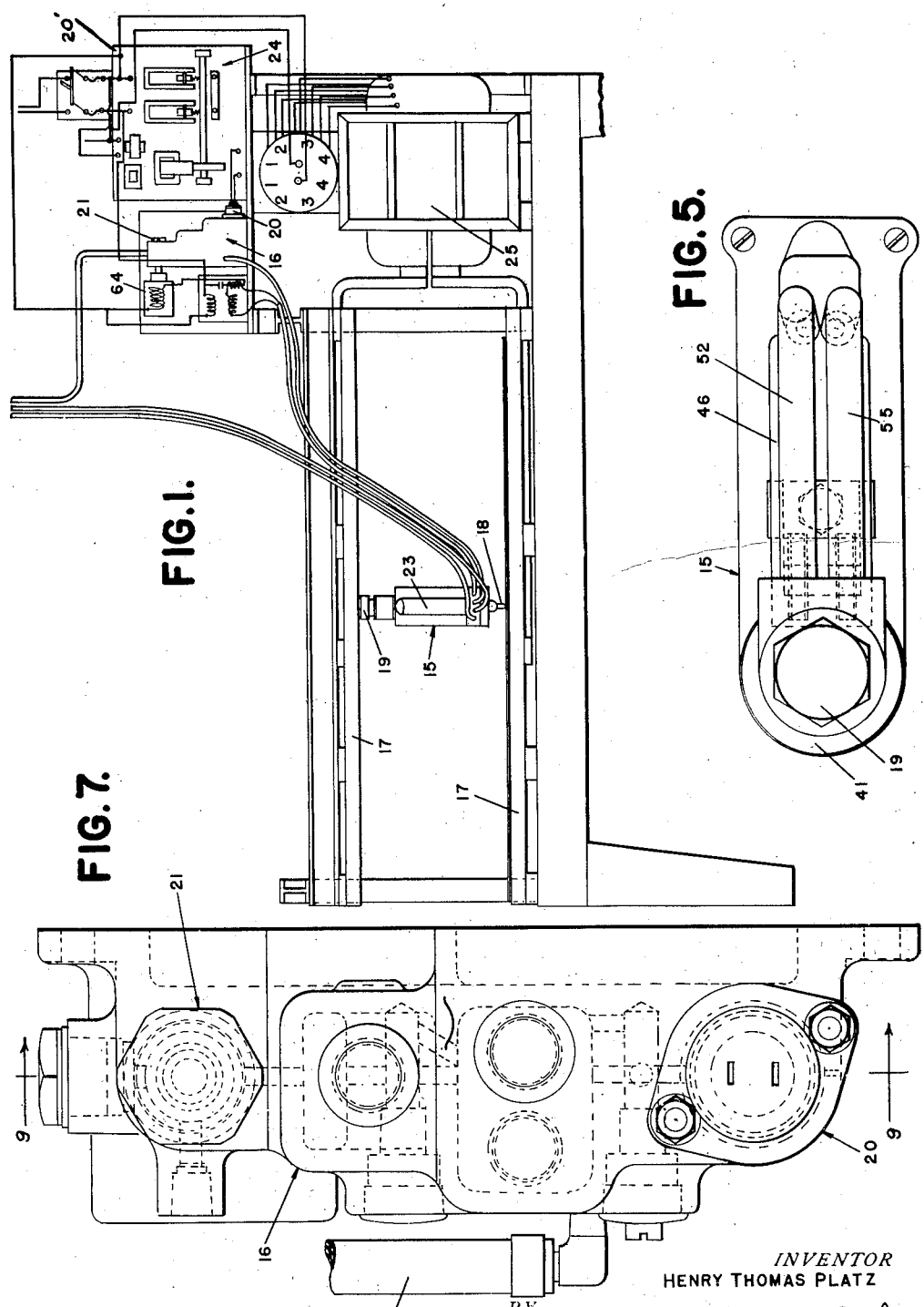
INVENTOR
HENRY THOMAS PLATZ
ATTORNEY Oct. 27, 1942.    H. T. PLATZ    2,300,172
AUTOMATIC BAR WELDING APPARATUS
Filed Dec. 9, 1935    3 Sheets-Sheet 2
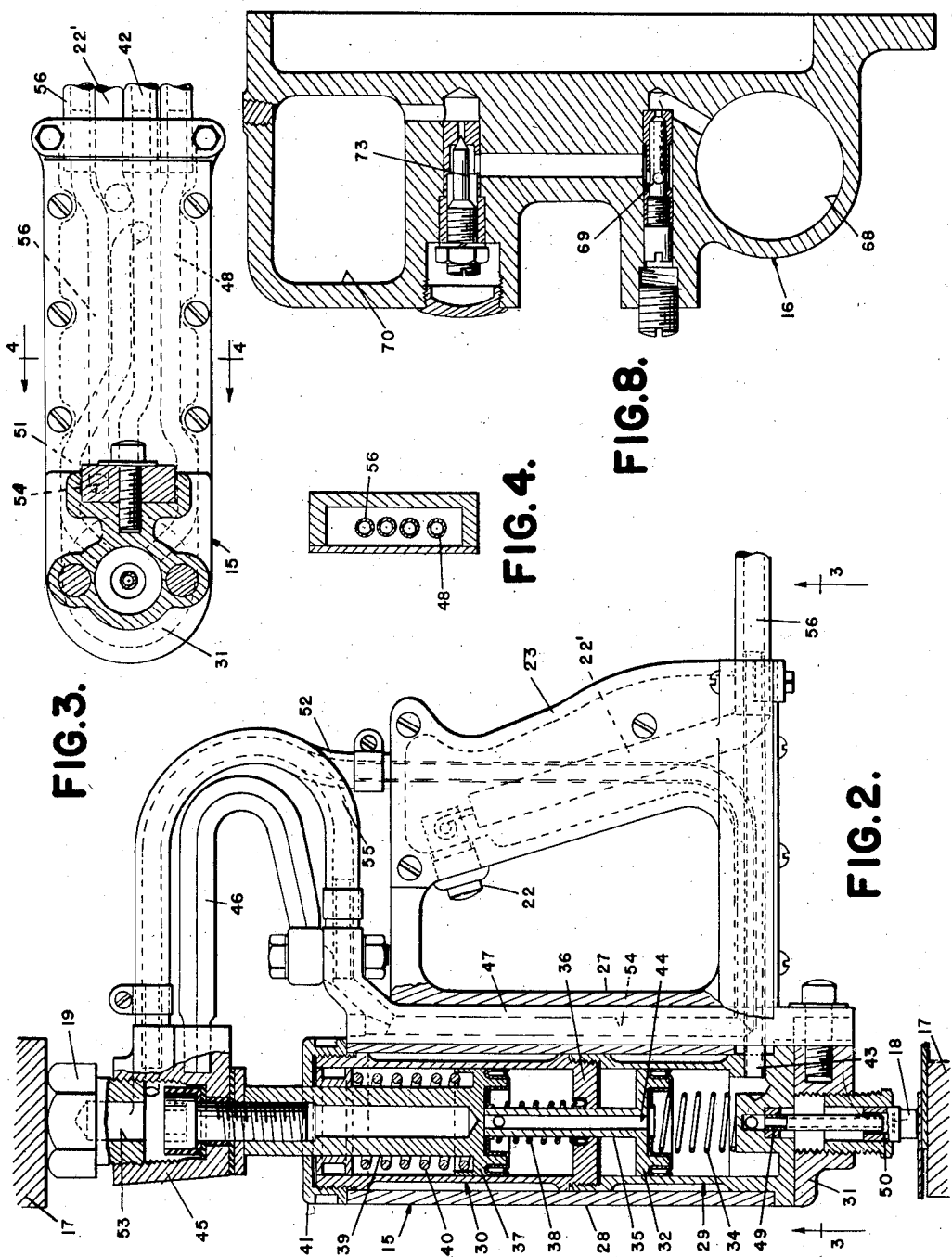
INVENTOR
HENRY THOMAS PLATZ
BY
ATTORNEYS Oct. 27, 1942.　　　H. T. PLATZ　　　2,300,172
AUTOMATIC BAR WELDING APPARATUS
Filed Dec. 9, 1935　　　3 Sheets-Sheet 3
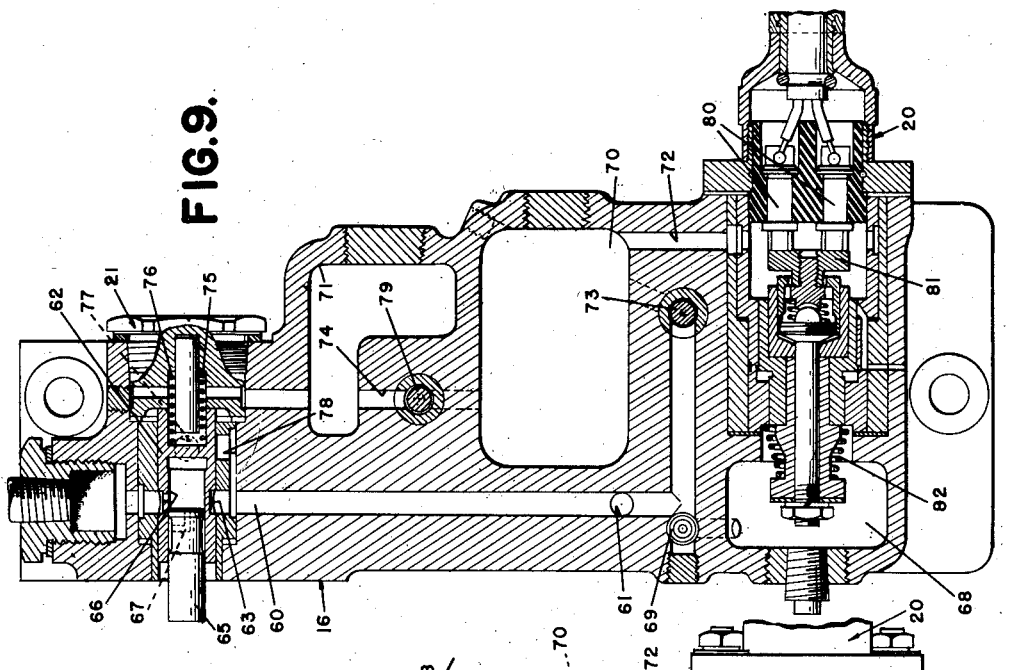
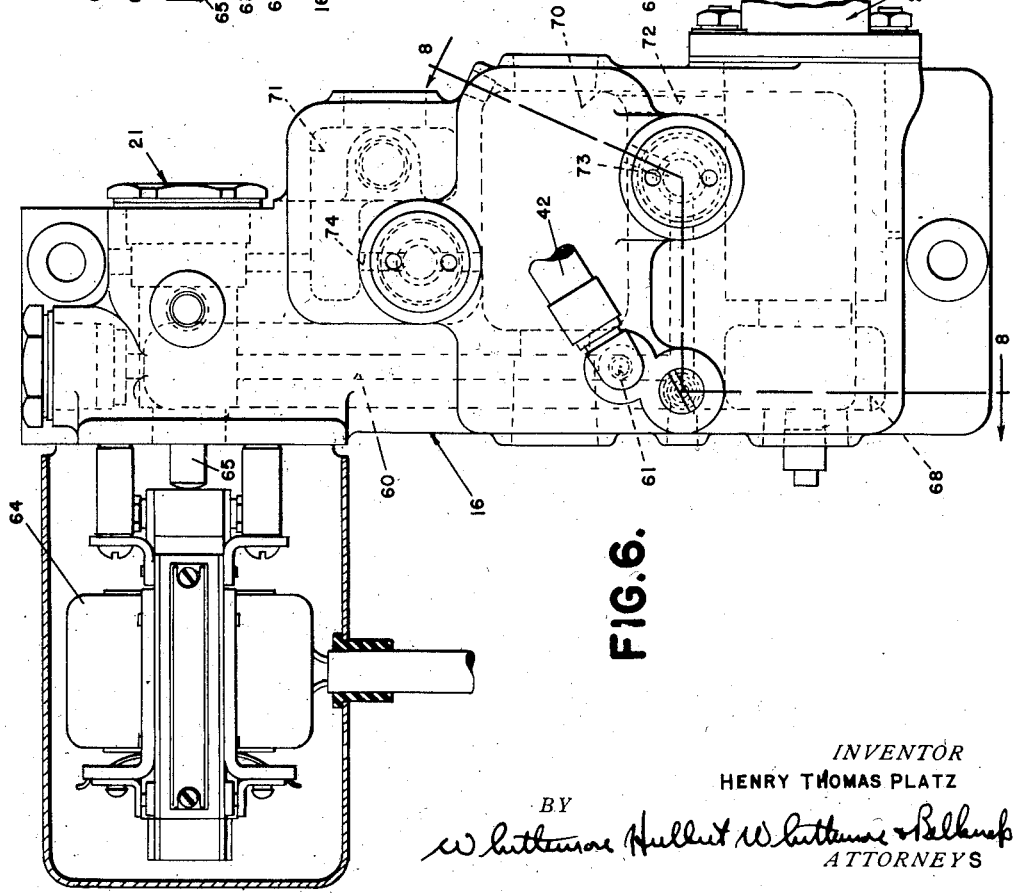
INVENTOR
HENRY THOMAS PLATZ
BY
ATTORNEYS Patented Oct. 27, 1942

2,300,172

UNITED STATES PATENT OFFICE 2,300,172

AUTOMATIC BAR WELDING APPARATUS

Henry Thomas Platz, Detroit, Mich., assignor to Briggs Manufacturing Company, Detroit, Mich., a corporation of Michigan Application December 9, 1935, Serial No. 53,630

6 Claims. (Cl. 219—4)

This invention relates generally to welding machines and refers more particularly to portable bar welding apparatus.

One of the principle objects of this invention consists in the provision of a portable bar welding machine having an extremely light relatively simple gun unit and having apparatus controlling the gun unit supported at a point remote from the gun unit, in such a manner as to permit movement of the latter relative to the control assembly. This construction affords complete control of the operation of the gun unit and at the same time, offers the possibility of reducing the weight of the gun unit to a minimum, irrespective of the weight of the apparatus required to secure complete control. The advantages of a relatively light gun unit are particularly desirable in portable bar welding apparatus, since the latter requires frequent manual manipulation of the gun unit.

Another advantageous feature of the present invention resides in the provision of control apparatus embodying a switch controlling the circuit to the electrodes of the gun unit and in addition, having means for not only automatically closing the switch in timed relation to relative movement of the electrodes to their operative positions, but for also automatically actuating the switch to open the circuit to the electrodes after a predetermined interval of welding.

Another object of this invention is to provide control apparatus of the character set forth in the preceding paragraph having means in association therewith for regulating the time interval between actuation of the switch to close and open the circuit to the electrodes.

A further feature of the present invention resides in the provision of control apparatus embodying means for automatically relatively moving the electrodes to their inoperative positions after the circuit to the electrodes has been opened by the switch and, in addition, having means for regulating the interval of operation of the latter means independent of the means provided for actuating the switch to open the circuit to the electrodes. This latter construction renders it possible to maintain the pressure on the work being welded after the switch has been actuated to open the welding circuit to the electrodes and this is a desirable feature, in that it renders it possible to actually forge the work.

In addition to the foregoing, the present invention contemplates an improved, relatively simple portable gun unit, and the construction of the latter, as well as other advantageous features of the present invention, will be made more apparent as this description proceeds, especially when considered in connection with the accompanying drawings, wherein Figure 1 is a semi-diagrammatic view, illustrating a typical installation of an automatic bar welding machine constructed in accordance with this invention;

Figure 2 is a side elevational view of the gun unit having certain parts broken away for the sake of clearness;

Figure 3 is a sectional view taken substantially on the plane indicated by the line 3—3 of Figure 1;

Figure 4 is a cross sectional view taken substantially on the plane indicated by the line 4—4 of Figure 3;

Figure 5 is a plan view of the gun unit shown in Figure 2;

Figure 6 is a front elevational view of the control apparatus employed in connection with the gun unit shown in Figure 2 and illustrating certain parts broken away for the sake of clearness;

Figure 7 is a side elevational view of the construction shown in Figure 6;

Figure 8 is a sectional view taken substantially on the plane indicated by the line 8—8 of Figure 6; and Figure 9 is a sectional view taken substantially on the plane indicated by the line 9—9 of Figure 7.

Referring now more in detail to the drawings and with special reference to Figure 1, it will be noted that there is illustrated in this figure, a portable gun unit 15 and a relatively fixed control assembly 16. The gun unit 15 is sufficiently light in weight as to permit the same to be manually manipulated and is shown in Figure 1 as disposed between a pair of electrical conductor bars 17 for sliding movement longitudinally of the bars. In the present instance, the work to be welded is supported upon the lower conductor bar 17 for engagement with the electrode 18 extending from the lower end of the gun unit, and the upper bar 17 is engaged by the co-operating electrode 19 carried at the upper end of the gun unit 15. As will be more fully hereinafter set forth, the desired pressure is exerted upon the work during the welding operation by effecting relative movement of the electrodes, in directions away from each other when the gun unit is supported in a position between the conductor bars.

In the present instance, the control apparatus 16 embodies means in the form of a fluid actuated switch 20 for controlling the circuit to the electrical contact bars 17 and is also provided with a valve assembly 21 operable to not only actuate the switch 20 to close the circuit to the electrodes, but in addition, to control relative movement of the electrodes into and out of operative position. Although the control apparatus 16 is mounted at a point remote from the gun unit 15, nevertheless, the valve assembly 16 is manually actuated to not only effect relative movement of the electrodes to their operative positions, but to also close the circuit to the electrodes by manipulation of a control 22, conveniently positioned on the grip 23 of the gun unit. By referring again to Figure 1, it will be noted that the switch 20 controls the operation of the power actuated switch 24 arranged in the high tension line for supplying electrical energy to the transformer 25, which in turn, is directly electrically connected to the contact bars 17. The power actuated switch panel 20' and the transformer 25, are of the conventional type available for welding apparatus and accordingly, it is not believed necessary to described the same in detail herein.

Referring now more in detail to the particular construction of the gun unit, attention is more particularly directed to Figures 2 to 5 inclusive. As shown in Figure 2, the gun unit 15 comprises a frame 27 having the grip 23 cast integral therewith and also having a vertically extending tubular portion 28 adapted to house a pair of axially aligned cylinders 29 and 30. The lower cylinder 29 is secured within the tubular portion 28 by means of a cap 31 having the electrode 18 secured thereto. Mounted for reciprocation in the cylinder 29 is a piston 32 normally urged in an upward direction by means of a spring 34 and having a tubular piston rod 35 extending through the closure 36 at the upper end of the cylinder 29 into the cylinder 30. The upper end of the piston rod 35 is adapted to butt the underside of a piston 37 reciprocably mounted in the cylinder 30 and normally urged in an upward direction by means of a spring 38 surrounding the piston rod 35 between the closure 36 and the piston 37. The latter piston is also provided with a piston rod 39 extending out of the upper end of the cylinder 30 and carrying the movable electrode 19. The combined action of the springs 34 and 38 on their respective pistons is counteracted by a spring 40 encircling the piston rod 39 between the upper side of the piston 37 and the cap 41, closing the upper end of the cylinder 30. The spring 40 is of greater strength than either of the springs 34 and 38 so as to effect movement of the electrode 19 toward the electrode 18 when the fluid pressure acting upon the pistons is relieved. As will be more fully hereinafter understood, fluid pressure is admitted simultaneously to both cylinders at the underside of the pistons herein so that both pistons co-operate in moving the electrode 19 in a direction away from the electrode 18.

Fluid under pressure from a source of supply is admitted to the cylinder 29 through the valve 21 by means of a conduit 42 communicating with the cylinder 29 adjacent the lower end thereof through the medium of a passage 43. The fluid pressure discharged into the cylinder 29 below the piston 32, passes through the opening 44 in the latter piston into the tubular rod 35, and is discharged from the upper end of the latter into the cylinder 30 below the piston 37. As fluid pressure is built up in both cylinders below the pistons therein, the latter are moved upwardly and, since the electrode 19 is carried by the piston 37, it necessarily follows that this electrode will be moved outwardly against the action of the spring 40.

The electrode 19 is secured to the piston rod 39 through the medium of a holder 45 insulated from the rod 39 and electrically connected to the electrode 18, through the medium of an electrical conductor 46 having one end secured to the holder and having the other end secured to a copper jumper bar 47 preferably cast integral with the frame and contacting with the cap 31 carrying the electrode 18. With this construction, it will be apparent that when the gun unit is in the position thereof shown in Figure 1, an electric circuit is established from the conductor bars 17 through the electrodes to the work being welded.

Provision is also made herein for effectively cooling the gun unit and principally the electrodes. As shown in Figure 3, a cooling medium is conducted to the electrode 18 for circulation adjacent the tip of the latter through the medium of an inlet conduit 48 having the discharge end thereof communicating with the upper end of a tube 49 extending vertically through the cap 31 and having the lower end communicating with a jacket 50 in the electrode 18. The cooling medium discharged from the lower end of the tube is caused to flow through a passage 51 extending through the grip 23 of the frame and communicating at the upper end with a flexible conduit 52, which in turn, discharges into the jacket 53 associated with the electrode 19. After the cooling medium has circulated through the jacket 53, the same is discharged into a vertical passage 54 by means of a flexible conduit 55 and is returned to the source of supply by the conduit 56 communicating with the lower end of the passage 54. In this connection, it will be noted that the passage 54 is formed through the copper jumper bar 47 and thereby, effectively cools the construction.

It has been previously stated that the valve assembly 21 not only controls the movement of the electrode 19 by the tandemly arranged pistons, but also controls the operation of the switch 20 to close the circuit to the electrodes through the conductor bars 17. As shown particularly in Figure 9, the valve assembly 21 is positioned in the control apparatus 16 to control the flow of fluid under pressure through a supply line 60 having the inlet end communicating with a source of fluid under pressure and having the discharge end communicating with the conduit 42, through the outlet 61 in the housing of the control apparatus 16. In order to simplify the description of this invention, the valve assembly 21 is shown as identical in construction to the one described in detail in my co-pending application, Serial No. 53,629, filed December 9, 1935, since matured into Patent No. 2,151,563, dated March 21, 1939, and accordingly, will only be briefly referred to herein.

As shown particularly in Figure 9, when the piston 62 of the valve assembly is in its rearwardmost position, fluid under pressure from the source of supply is permitted to flow past the valve through an annular groove 63 formed in the piston. The piston 62 is moved to its rearwardmost position by means of a solenoid 64 acting upon a plunger 65 slidably supported in a recess 66 at the forward end of the piston 62.

The circuit to the solenoid is manually controlled by means of the switch 22 mounted in a convenient position on the grip 23 of the gun unit and electrically connected to the coil of the solenoid through the medium of the conductors 22'. It may be pointed out at this time that when the plunger 65 has been moved rearwardly by the solenoid 64, communication is established from the source of fluid under pressure through the passage 67 in the plunger to the recess 66 in rear of the plunger, with the result that the plunger 65 will be returned to its forwardmost position by the pressure of the fluid acting upon the rear end of the plunger.

The fluid by-passing the valve assembly 21 in the manner previously set forth, is permitted to flow out of the control apparatus through the opening 61 and conduit 42 to the cylinders 29 and 30 of the gun unit, causing the pistons in the cylinders to move the electrode 19 upwardly, or in a direction away from the electrode 18. The fluid under pressure passing around the valve assembly 21 in the control apparatus is also permitted to flow into a chamber 68 associated with the switch assembly 20 and serves to actuate the switch to close the circuit to the electrodes. The interval of operation of the switch assembly 20 to close the circuit to the electrodes after the latter have been moved to operative positions, is accurately controlled by means of a metering valve 69 positioned to regulate the flow of fluid under pressure into the switch chamber 68.

Fluid under pressure flowing from the source of supply around the valve assembly 21 is also permitted to flow into an accumulating chamber 70 having communication with a valve control chamber 71 and with the interior of the switch assembly 20. The accumulating chamber 20 communicates with the interior of the switch through the medium of a passage 72 and, as will be more fully hereinafter set forth, automatically functions to actuate the switch to open the circuit to the electrodes after a predetermined interval of welding. The interval of weld, or in other words, the flow of fluid under pressure into the switch assembly from the accumulating chamber 70 is accurately regulated by means of a metering valve 73 located to control the flow of fluid pressure from the source of supply into the accumulating chamber.

Fluid under pressure from the accumulating chamber is admitted to the valve control chamber 71 through the medium of a passage 74 and, as will be observed from Figure 9, the chamber 71 communicates with a recess 75 in the rear end of the piston to assist the spring 76 in automatically moving the piston valve member 62 forwardly to a position wherein communication from the source of supply through the passage 60 is closed. Of course, closing communication through the passage 60 permits the fluid pressure, acting on the underside of the pistons in the gun unit, to exhaust or flow back into the passage 60 through an exhaust port 77 communicating with the passage 60 by means of a groove 78. As a consequence, movement of the piston valve 62 forwardly closes communication through the passage 60 and permits the spring 40 to move the electrode 19 downward, or in a direction toward the electrode 18, and the time interval of this operation is accurately regulated by a metering valve 79 located in the passage 74 to control the flow of fluid pressure from the accumulating chamber 70 to the valve control chamber 71. It will be apparent from the foregoing that although the electrodes are maintained in their operative positions until the circuit is opened by the switch assembly 20, nevertheless, the interval of relative movement of the electrodes to their inoperative positions is not dependent upon the interval of operation of the switch to open the circuit to the electrodes. In other words, the electrodes may be held in their operative positions after the circuit to the electrodes has been opened and this is desirable, since it renders it possible to effect a forging of the work subsequent to the welding operation. The above will be readily apparent when considering that the flow of fluid pressure from the accumulating chamber to the switch assembly for actuating the latter to open the circuit is not only controlled by a metering valve 73, but the flow of fluid pressure from the accumulating chamber to the valve control chamber 71 to close the valve is independently controlled by the metering valve 79.

Reference has been made to the operation of the switch assembly 20 by fluid pressure to not only automatically close the circuit to the electrodes, but to also open this circuit after a predetermined interval of welding. The particular construction of the switch assembly 20 has also been described in detail in my copending application, referred to above, and therefore, a detailed description of the same herein is believed unnecessary. Briefly, the switch assembly comprises a pair of stationary contacts 80 adapted to be bridged by a movable contact member 81, normally urged in a direction away from the stationary contacts by means of a spring 82. Upon reference to Figure 9, it will be noted that the movable contact member is exposed to the fluid pressure in the chamber 68 in such a manner that this fluid pressure tends to overcome the action of the spring 82 and actually move the contact member 81 to a position wherein the same bridges the stationary contacts 80. It will also be observed from the above figure that the point of communication of the accumulating chamber 70 with the interior of the switch assembly 20 is such that the fluid under pressure admitted to the latter by the former tends to assist the action of the spring 82 in moving the contact 81 in a direction away from the stationary contacts 80. Thus, it will be apparent that when the combined force of the spring 82 and the pressure of the fluid, admitted into the switch assembly by the accumulating chamber, exceeds the pressure in the chamber 68, the switch member 81 is moved in a direction away from the stationary contacts to open the circuit to the electrodes. As clearly pointed out above, the interval of time required for the pressure in the accumulating chamber to actuate the switch to open the circuit to the electrodes is accurately controlled by the metering device 73.

Thus, from the foregoing, it will be observed that I have provided an efficient, relatively simple bar welding machine embodying control apparatus for the portable gun unit fixedly supported at a point remote from the unit so that the weight of the latter may be reduced to a minimum. This construction is advantageous since it renders it possible to provide the required apparatus for completely and automatically controlling the portable gun unit without increasing the weight of the latter. The fact that the operation of the gun unit is completely controlled is clearly set forth in the foregoing description wherein it is stated that the control apparatus embodies first; means rendered operative from a convenient point on the gun unit for effecting relative movement of the electrodes to their operative position and for automatically closing the circuit to the electrodes after the latter have been moved to their operative position, second; means for regulating the interval of operation of the switch to close the circuit to the electrodes after the latter are in their operative positions, third; means for actuating the switch to open the circuit to the electrodes after a predetermined interval of welding, fourth; means for automatically relatively moving the electrodes to their inoperative positions after the circuit to the electrodes has been opened, fifth; means for regulating the interval of operation of the switch to open the circuit to the electrodes and sixth; means for independently regulating the interval of relative movement of the electrodes to their inoperative positions after the circuit to the electrodes has been opened.

What I claim as my invention is:

1. In a welding device, a portable unit having a fluid pressure cylinder and having relatively movable electrodes, a piston working in the fluid pressure cylinder and operatively connected to one of the electrodes for moving the same, means electrically connecting the electrodes including a contact bar extending to one side of the cylinder, and means for cooling the electrodes including a jacket for the cooling medium extending through the contact bar.

2. In a welder, a frame, a cylinder and a piston supported on the frame for relative movement in opposite directions, cooperating electrodes respectively carried by the piston and cylinder, and means electrically connecting the electrodes including a jumper bar carried by the frame and shunting the cylinder and piston.

3. In a welder, a frame having a cylinder, a piston reciprocably mounted in the cylinder, a jumper bar of good electrical conducting material supported on the frame to one side of the cylinder and extending lengthwise of the cylinder, electrodes respectively carried by the cylinder and piston, a flexible electrical conductor connecting the electrode carried by the piston to one end of the jumper bar, and means electrically connecting the other electrode to said bar.

4. In a welder, a frame, a cylinder and a piston supported on the frame for relative movement in opposite directions, cooperating electrodes respectively carried by the piston and cylinder, means electrically connecting the electrodes including a jumper bar carried by the frame and shunting the cylinder and piston, and means for circulating a cooling medium through a passageway extending through the jumper bar.

5. In a welder, a cast frame having a cylinder, a piston reciprocably mounted in the cylinder, an electrode positioned beyond one end of the cylinder and insulatingly connected to the piston, a second electrode supported on the cylinder at the opposite end of the latter, a jumper bar of good electrical conducting material cast in said frame to one side of the cylinder and extending lengthwise of the cylinder, a flexible electrical conductor connecting the first electrode to said bar, and means electrically connecting the second electrode to the jumper bar.

6. In a portable welder, a frame having a hand grip and having a cylinder opposite said grip, a piston reciprocably mounted in the cylinder, an electrode supported on the piston beyond one end of the cylinder, a second electrode supported on the cylinder at the opposite end of the cylinder, a jumper bar extending through the frame between the cylinder and grip, a flexible electrical conductor connecting the first electrode to the jumper bar, and means electrically connecting the other electrode to said jumper bar.

HENRY THOMAS PLATZ.